United States Patent [19]

Besemann

[11] Patent Number: 4,572,350
[45] Date of Patent: Feb. 25, 1986

[54] APPARATUS FOR DIVERTING STACKS OF SHEETS IN PAPER PROCESSING MACHINES

[75] Inventor: Alfred Besemann, Hamburg, Fed. Rep. of Germany

[73] Assignee: E. C. H. Will GmbH & Co., Hamburg, Fed. Rep. of Germany

[21] Appl. No.: 597,760

[22] Filed: Apr. 6, 1984

[30] Foreign Application Priority Data

Apr. 9, 1983 [DE] Fed. Rep. of Germany ....... 3312750

[51] Int. Cl.⁴ ............................................ B65G 47/46
[52] U.S. Cl. .................................... 198/372; 271/224; 198/457; 198/956
[58] Field of Search ............... 198/365, 372, 457, 598, 198/956, 633, 636; 271/224; 188/67, 300; 414/46

[56] References Cited

U.S. PATENT DOCUMENTS

| | | | |
|---|---|---|---|
| 1,881,895 | 10/1932 | Olson | 198/372 X |
| 3,181,685 | 5/1965 | Brunner et al. | 198/372 |
| 3,303,923 | 2/1967 | Davis | 198/365 X |
| 3,456,773 | 7/1969 | Titmas, Jr. | 198/365 |
| 3,907,128 | 9/1975 | Cathers | 271/224 X |
| 4,380,332 | 4/1983 | Davis | 198/956 X |

FOREIGN PATENT DOCUMENTS

| | | | |
|---|---|---|---|
| 2310150 | 9/1974 | Fed. Rep. of Germany | 198/365 |
| 2535285 | 2/1976 | Fed. Rep. of Germany | 198/372 |
| 2705509 | 8/1978 | Fed. Rep. of Germany | 414/46 |
| 2743816 | 4/1979 | Fed. Rep. of Germany | 198/457 |
| 59-31211 | 2/1984 | Japan | 198/365 |

Primary Examiner—Joseph E. Valenza
Assistant Examiner—Jonathan D. Holmes
Attorney, Agent, or Firm—Peter K. Kontler

[57] ABSTRACT

A first transporting unit advances a series of stacks of paper sheets along a straight first path. A transfer conveyor can be lifted into the first path to divert selected stacks into the range of a second transporting unit which defines a second path making an oblique angle with the first path. The transfer conveyor is assisted by a pusher which is adjacent to the first path opposite the stack-receiving end of the second transporting unit and is movable at right angles to the first path to move the diverted stack sideways. Such stack strikes a yieldable bumper which expels it from the second path into the range of a third transporting unit serving to advance stacks in parallelism with or at right angles to the direction of movement of stacks along the first path. The orientation of selected stacks remains unchanged during diversion from the first into the second path as well as during diversion from the second into the third path.

35 Claims, 6 Drawing Figures

APPARATUS FOR DIVERTING STACKS OF SHEETS IN PAPER PROCESSING MACHINES

BACKGROUND OF THE INVENTION

The present invention relates to apparatus for manipulating stacked commodities, particularly paper sheets, and more particularly to improvements in stack transporting apparatus wherein selected stacks of a series or succession of discrete stacks can be removed or diverted from their path for discarding or for transport to one or more processing stations.

It is known to divert selected commodities of a succession of equidistant or randomly spaced commodities by resorting to a so-called diagonal conveyor which is designed to advance selected commodities at a certain angle with reference to the direction of movement of commodities into the range of such diagonal conveyor. The latter can comprise a set of rollers, one or more straight belt conveyors, one or more arcuate belt conveyors, an arcuate switching device or the like. Means is provided to raise the diagonal conveyor into the path of movement of oncoming commodities whereby the diagonal conveyor diverts one or more selected commodities from their original path. The diagonal conveyor is thereupon caused to descend to a level below that of the conveyor or conveyors which define the primary path for the commodities so that the next-following commodities remain undiverted.

A drawback of the above outlined conventional apparatus is that they cannot handle stacks of paper sheets or the like when the stacks must be transported at an elevated speed. Rapid acceleration, deceleration and/or change in the direction of movement of stacks causes them to change their shape so that they cannot be introduced into snugly fitting boxes or other types of receptacles. Moreover, deviation of the shape of transported stacks from their original parallelepiped shape can create problems during other types of further processing, e.g., if the stacks are to be provided with rows of perforations at a predetermined distance from a marginal portion of each sheet in the stack preparatory to insertion of spiral or otherwise configurated binders for conversion of stacks into steno pads, exercise books and analogous stationery products. When the speed of the stacks exceeds a certain limit, the diagonal conveyor is simply incapable of preventing deformation and/or complete collapse of stacks during diversion of stacks from their original path. On the other hand, the trend in paper processing plants is toward a continuously increasing output which renders it necessary to divert selected stacks from their original path as quickly as possible without reducing the speed of the remaining stacks.

OBJECTS AND SUMMARY OF THE INVENTION

An object of the invention is to provide an apparatus which can be used in a paper processing machine to manipulate stacks of paper sheets or the like at an elevated speed but without permitting or causing deformation of stacks, even in the event of abrupt acceleration, deceleration and/or change in the direction of movement.

Another object of the invention is to provide an apparatus which can divert selected stacks from their original path without in any way affecting the remaining stacks.

A further object of the invention is to provide the apparatus with novel and improved means for assisting and influencing the conventional diverting instrumentalities in diverting selected stacks without deformation and without changes in orientation of diverted stacks.

An additional object of the invention is to provide the apparatus with novel and improved means for manipulating diverted stacks.

Still another object of the invention is to provide a novel and improved method of manipulating stacks in a paper processing plant.

Another object of the invention is to provide an apparatus which can be used as a superior substitute for conventional apparatus in paper processing plants.

A further object of the invention is to provide the apparatus with novel and improved means for preventing deformation and/or collapse of stacks during and subsequent to diversion from their original path.

Another object of the invention is to provide the apparatus with novel and improved means for predictably diverting selected stacks in a small area and without deceleration of selected stacks.

The invention is embodied in an apparatus for manipulating stacks of paper sheets or the like. The apparatus comprises a first transporting unit which serves to advance a succession of stacks in a first direction, at a predetermined level and along a first path, a second transporting unit which serves to advance selected stacks of the succession of stacks along a second path and in a second direction at an oblique angle to the first direction and has a stack-receiving portion adjacent to one side of the first path, a transfer conveyor which is normally disposed below the predetermined level and is operable to advance selected stacks from the first path, in the second direction and onto the stack-receiving portion of the second transporting unit, means for raising and lowering the transfer conveyor above and below the predetermined level so that, when raised, the transfer conveyor extends into the first path and transfers the oncoming selected stack into the second path, a pusher which is adjacent to the other side of the first path opposite the stack-receiving portion of the second transporting unit, means for moving the pusher transversely of the first path so that the pusher assists the transfer conveyor in delivering selected stacks to the stack-receiving portion of the second transporting unit and preserves the orientation of selected stacks during such transfer, and a yieldable bumper which is disposed at the one side of the first path and serves to deflect or expel transferred stacks from the second path.

The first transporting unit can comprise a plurality of elongated belt conveyors having stack-engaging upper reaches disposed at the predetermined level. The second transporting unit also preferably comprises a plurality of endless belt conveyors having stack-engaging upper reaches. The pusher is preferably movable at right angles to the first direction. A third transporting unit is preferably provided to receive deflected stacks from the second transporting unit; the third transporting unit defines a third path which is parallel with or normal to the first path.

The pusher preferably comprises a stack-supporting portion (e.g., a substantially L-shaped profiled member) and the first transporting unit then preferably comprises an endless belt conveyor having a stack-engaging portion (preferably the upper reach of such conveyor)

which slopes upwardly toward the stack-supporting portion of the pusher.

The apparatus further comprises a driven shaft which drives a first cam forming part of the means for raising and lowering the transfer conveyor and a second cam forming part of the means for moving the pusher. A second shaft is provided to drive a rotary drive means (e.g., a pulley) for the transfer conveyor, and the apparatus further comprises means for transmitting torque from the second shaft to the driven shaft and means for transmitting torque from the second shaft to the drive means. At least one of the torque transmitting means can constitute a toothed belt conveyor.

The apparatus preferably further comprises intermittently operated clutch means which is interposed between the cams and the driven shaft. Such clutch means can be designed to rotate the cams through one revolution in response to each engagement of the clutch means. The clutch means preferably comprises means for braking the cams in disengaged condition of the clutch means. The means for moving the pusher preferably further comprises a one-armed lever which serves to track the second cam and to transmit motion to the pusher. The means for moving the pusher can further comprise a link which is interposed between the lever and the pusher.

The means for raising and lowering the transfer conveyor preferably further comprises a two-armed lever which serves to track the first cam and to transmit motion to the transfer conveyor, e.g., through the medium of a vertical or nearly vertical lifting device.

The apparatus preferably further comprises shock absorber means for yieldably opposing movement of the bumper under the action of a transferred stack. Such apparatus preferably further comprises means for permanently biasing the bumper to an extended position from which the bumper is movable by transferred stacks, and means for blocking return movement of the bumper to extended position under the action of the biasing means while the bumper is engaged by a stack. Still further, the apparatus comprises resetting means for returning the bumper to its extended position and for simultaneously deactivating the blocking means. Such resetting means preferably comprises a fluid-operated motor having a reciprocable piston rod and a ram which is provided on the piston rod and serves to move the bumper back to the extended position. The piston rod is arranged to move the ram forwardly and backwards whereby the ram moves the bumper back to the extended position in response to forward movement. The blocking means includes a portion (e.g., a two-armed lever) which is disposed in the path of movement of the ram so that the blocking means is activated and deactivated when the ram respectively performs a rearward and a forward movement. The bumper preferably comprises an elongated guide which tiltably supports the lever of the blocking means. The latter preferably further comprises a spring which serves to bias the lever of the blocking means and a stop which is located in the path of movement of the lever under the action of the spring.

The shock absorber means preferably comprises a liquid-containing chamber (e.g., an oil-filled chamber) and a plunger which is reciprocably mounted in the chamber and is connected to the bumper. The plunger is arranged to oppose the movement of the bumper under the action of transferred stacks (i.e., from the extended position) with a force whose magnitude is a function of the speed of movement of the bumper, and the shock absorber means then further comprises resilient means (e.g., the aforementioned means for biasing the bumper to extended position) for effecting linear amplification of such force in response to movement of the bumper under the action of a transferred stack. The chamber of the shock absorber means has outlet means and means for varying the effective cross-sectional area of such outlet means in order to vary the resistance which the shock absorber means offers to movement of the bumper under the action of a stack.

The apparatus further comprises means (e.g., a photoelectronic monitoring device which is adjacent to the first path and serves to transmit signals in response to detection of selected stacks) for initiating the operation of the raising and lowering means for the transfer conveyor and the operation of means for moving the pusher. The means for initiating the operation of the resetting means for the bumper can comprise a photoelectronic monitoring device which serves to generate signals on detection of expulsion of transferred stacks from the second path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
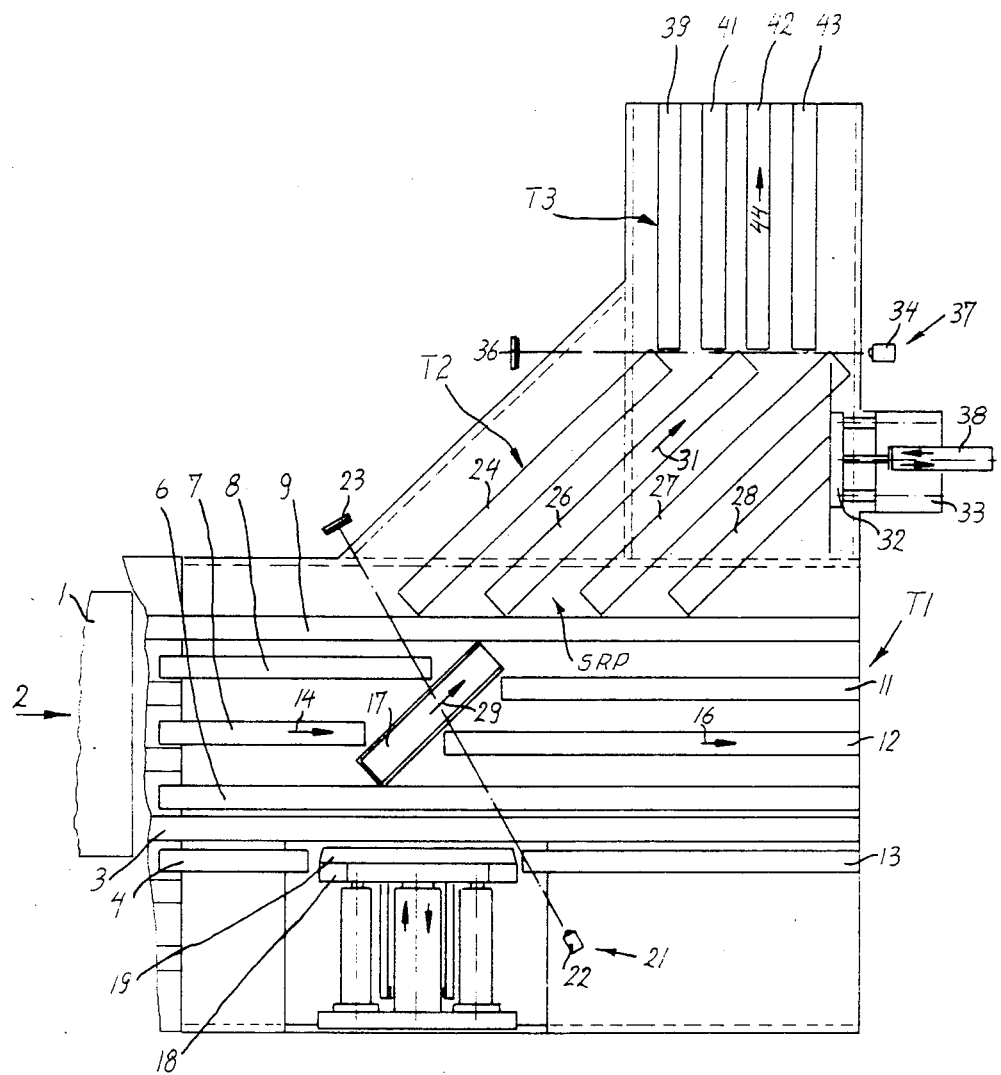
FIG. 1 is a somewhat schematic plan view of an apparatus which embodies one form of the invention, the pusher being shown in retracted and the bumper being shown in the extended position.

Referring first to FIG. 1, there is shown an apparatus which serves to divert selected stacks 1 from a straight series of such stacks while the stacks advance along a first path which is defined by several belt conveyors 3, 4, 6, 7, 8, 9, 11, 12, 13 together constituting a first transporting unit T1 serving to advance stacks in the direction which is indicated by arrows 14 and 16. The manner in which successive stacks 1 are delivered to the conveyors 3, 4, 6, 7, 8, 9 of the first transporting unit T1 (see the arrow 2) forms no part of the invention.

The means for diverting selected stacks 1 from the first path into a second path, which is defined by a second transporting unit T2, comprises a transfer conveyor 17 which serves to advance selected stacks at an oblique angle to the direction indicated by arrows 14, 16, namely in the direction which is indicated by the arrow 29. Such direction coincides with the direction (see the arrow 31) of advancement of selected stacks 1 with the upper reaches of belt conveyors 24, 26, 27, 28 which constitute the second transporting unit T2. The transfer conveyor 17 is an endless belt conveyor which is trained over pulleys 17a (see FIG. 3) and whose upper reach 17b can be raised to a level above that of the horizontal or substantially horizontal upper reaches of conveyors forming part of the transporting unit T1 in order to lift a selected stack 1 off the transporting unit T1 and to begin to move the lifted stack in the direction of arrow 29 and into the range of the stack-receiving portion SRP of the transporting unit T2. The conveyors 24, 26, 27, 28 of the unit T2 then take over and advance the diverted stack 1 in the direction of arrow 31.

The transfer conveyor 17 is assisted by a pusher 18 which is reciprocable at right angles to the direction indicated by arrows 14, 16. It will be noted that the pusher 18 is normally located at one side of the path of movement of stacks 1 with the conveyors 3, 5, 6, 7, 8, 9 and that the stack-receiving portion SRP of the transporting unit T2 is located at the other side of such path opposite the pusher. The conveyor 17 is located between the pusher 18 and the portion SRP. The upper reach of the conveyor 4 slopes slightly upwardly toward the level of a horizontal ledge which is defined by a generally L-shaped stack-supporting portion 19 of the pusher 18. This ensures that one lateral marginal portion of each selected stack 1 is transferred onto the portion 19 before the pusher 18 is moved from the retracted position of FIG. 1 to an extended position in order to assist the conveyer 17 in transferring the selected stack 1 onto the portion SRP of the transporting unit T2.

The upward movement of the conveyor 17 and the forward movement of the pusher 18 (in a direction from the retracted toward the extended position) are started by signals which are generated by a monitoring device 21 including a photocell 22 and a reflector 23. The monitoring device 21 detects the leaders of successive stacks 1 but is arranged to transmit signals for lifting of the transfer conveyor 17 and for movement of the pusher 18 from retracted position only when a selected stack is about to advance into the space above the upper reach 17b.

The stack which is diverted by the transfer conveyor 17 in conjunction with the pusher 18 does not change its orientation at all. One of its sides slides along the pusher 18 while the latter moves toward its extended position; at the same time, such stack moves forwardly under the influence of the conveyor 17. The front end face of such stack is thereupon caused to bear against and to depress a yieldable bumper 32 which is adjacent to the front ends of the upper reaches of the belt conveyors 27, 28. The bumper 32 automatically expels the diverted stack from the second path and causes it to enter a third path defined by a third transporting unit T3 serving to advance the stack in the direction of arrow 44, i.e., at right angles to the direction of movement of stacks along the first path (arrows 14, 16). The transporting unit T3 includes a set of parallel belt conveyors 39, 41, 42, 43. The transfer of stacks from the second into the third path under the influence of the yieldable bumper 32 also takes place without any change in the orientation of stacks. The bumper 32 can yield against the opposition of a shock absorber 33 which absorbs the kinetic energy of stacks impinging upon the bumper (namely, the kinetic energy attributable to that component of movement of diverted stacks which is parallel to the direction indicated by the arrows 14, 16).

The means for initiating resetting of the bumper 32 to its original non-depressed position includes a monitoring device 37 including a photocell 34 and a reflector 36. This monitoring device transmits a "reset" signal as soon as a freshly expelled stack leaves the path which is defined by the transporting unit T2. The resetting means comprises a fluid-operated motor 38.

The level of the upper reaches of the conveyors 39, 41, 42, 43 can be the same as that of the upper reaches of the conveyors 24, 26, 27, 28. The upper reaches of the conveyors 24, 26, 27, 28 can be at the level of or somewhat above the upper reaches of the conveyors 3, 6, 7, 8, 9, 11, 12 and 13.

Figure 2:
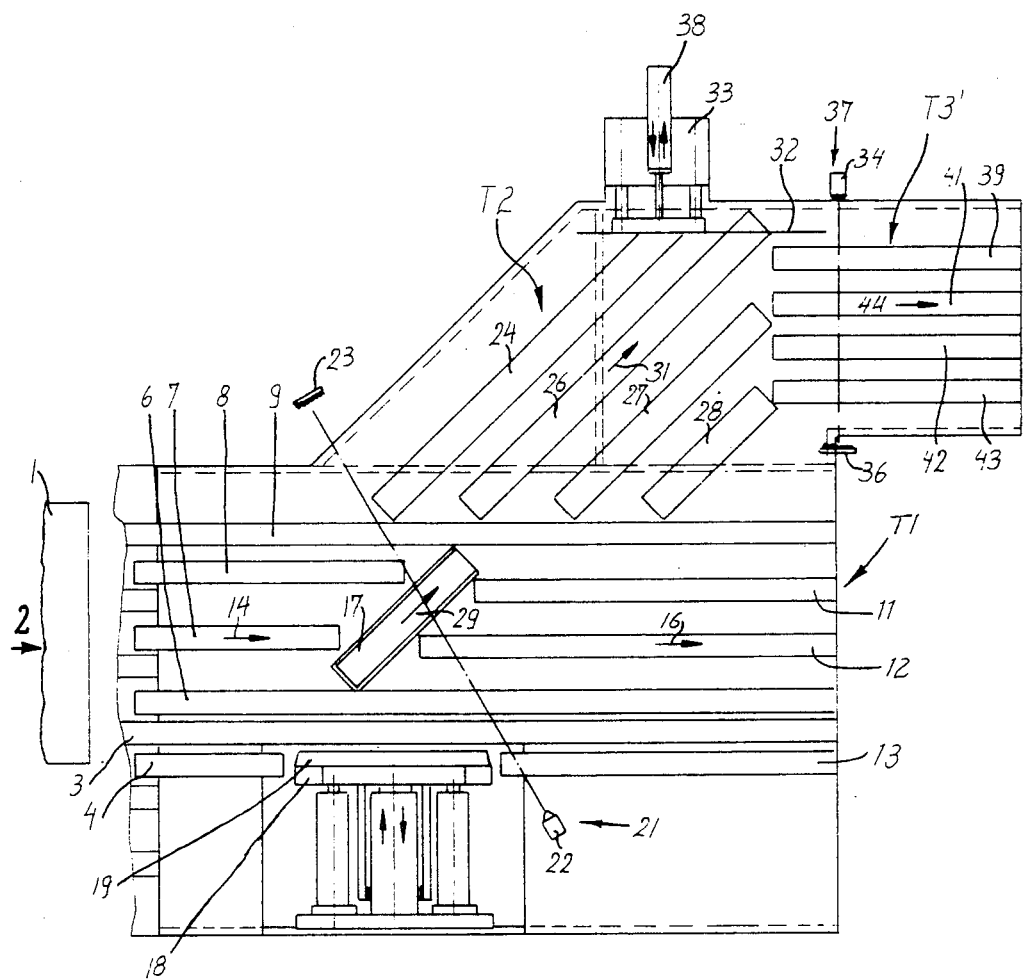
FIG. 2 is a similar plan view of an apparatus which constitutes a modification of the apparatus shown in FIG. 1.

The apparatus which is shown in FIG. 2 is very similar to that of FIG. 1 and its parts are denoted by similar reference characters. The only difference is that the yieldable bumper 32 is parallel to the conveyors of the first transporting unit T1 and is adjacent to the front ends of the conveyors 24, 26 so that it can expel stacks 1 from the second path (transporting unit T2) into a different third path defined by a third transporting unit T3'. The conveyors 39, 41, 42, 43 of the transporting unit T3' are parallel to the conveyors 3, 4, 6, 7, 8, 9, 11, 12, 13, i.e., the third path is parallel to but laterally offset from the first path.

Figure 3:
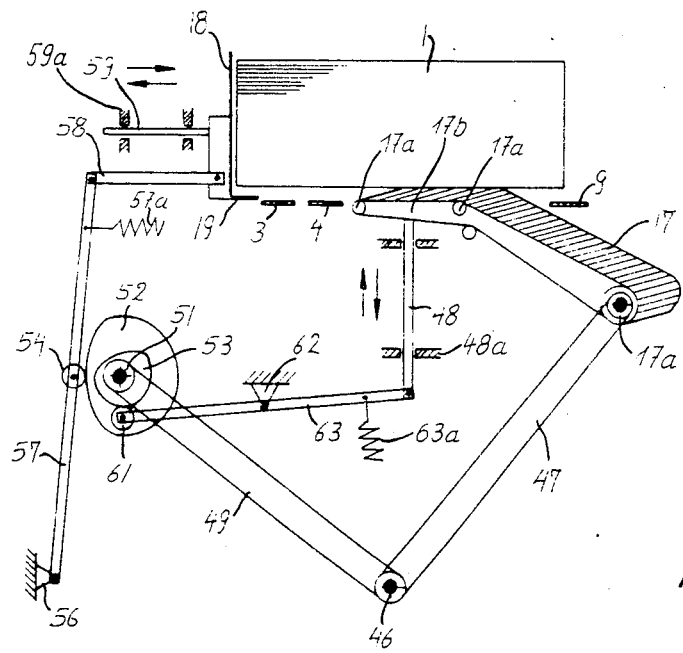
FIG. 3 is an elevational view of the means for reciprocating the pusher and for raising and lowering the transfer conveyor.
Figure 4:
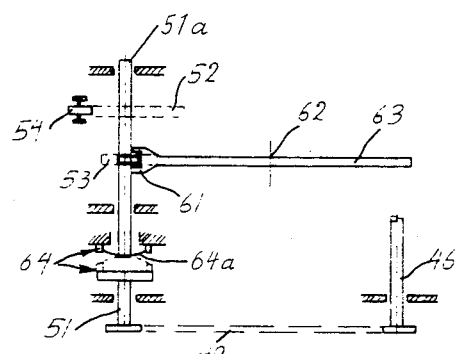
FIG. 4 is a plan view of the structure which is shown in FIG. 3.

The means for driving one of the pulleys 17a for the transfer conveyor 17, namely that pulley 17a which constitutes a rotary drive means for the conveyor 17, for raising and lowering the upper reach 17b of the conveyor 17, and for moving the pusher 18 between extended and retracted positions comprises a shaft 46 (FIG. 3) which can be driven by the main prime mover (not shown) of the paper processing machine. The shaft 46 drives a shaft 51 through the medium of a first torque transmitting device in the form of a toothed belt conveyor 49, and the one pulley 17a through the medium of a second torque transmitting device 47, preferably a toothed belt conveyor. The shaft 51 is coaxial with a shaft 51a which is fixedly connected with two disc cams 52, 53 (see also FIG. 4). When the continuously driven shaft 51 is free to transmit torque to the shaft 51a through the medium of a normally disengaged clutch 64 (e.g., an electromagnetically engageable clutch which is equipped with a braking device 64a for the shaft 51a*), the cam 53 can raise and thereupon lower the upper reach 17b of the transfer conveyor 17 through the medium of a motion transmitting device in the form of a two-armed lever 63 fulcrumed at 62 in the frame of the paper processing machine and a lifting device 48, and the cam 52 can effect a movement of the pusher 18 from the retracted to the extended and back to the retracted position through the medium of a one-armed motion transmitting lever 57 (fulcrumed at 56) and a link 58. The pusher 18 has an elongated rod 59 which is reciprocable in bearings 59a under the action of the cam 52 and a spring 57a which biases a roller follower 54 of the lever 57 against the face of the cam 52. A spring 63a biases a roller follower 61 of the lever 63 against the face of the cam 53. The lifting device 48 is reciprocable in bearings 48a. FIG. 3 further shows the upper reaches of the belt conveyors 3, 4 and 9 which form part of the first transporting unit T1. When the stacks 1 are to advance along the entire first path, i.e., from the conveyors 3, 4, 6, 7, 8, 9 onto the conveyors 11, 12 and 13, the upper reach 17b of the transfer conveyor 17 is held at a level below that of the upper reaches of the conveyors 3, 6, 7, 8 and 9. The pusher 18 is then held in the retracted position and the clutch 64 is disengaged whereby the braking device 64a holds the shaft 51a in an angular position such that the pusher 18 is retracted and the conveyor 17 cannot interfere with advancement of stacks 1 from the conveyors 3, 4, 6, 7, 8, 9 to the conveyors 11, 12, 13.

*Such as MIV-5-01 of Maschinenfabrik-Stromag in Unna, German Federal Republic

Figure 5:
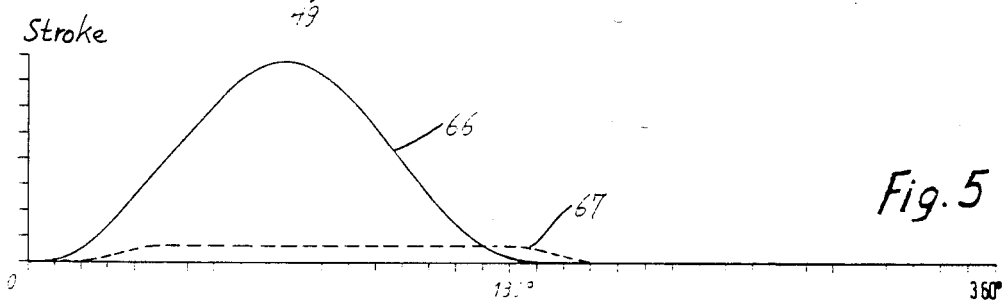
FIG. 5 illustrates curves denoting the extent of movement of the pusher and transfer conveyor as a function of time.

The clutch 64 is preferably of the type which can be engaged (in response to a signal from the monitoring device 21) for an interval that is necessary to enable the shaft 51a to complete a single revolution. This enables the cam 52 and the spring 57a to move the pusher 18 from the retracted to the extended and back to the retracted position, and the cam 53 and spring 63a to move the upper reach 17b from the lowered to the raised and back to the lowered position. The curve 66 of FIG. 5 denotes the movement of the pusher 18 while the shaft 51a completes a full revolution, and the curve 67 denotes the movement of the upper reach 17b during the same revolution of the shaft 51a. As mentioned above, the monitoring device 21 is caused to engage the clutch 64 only when a selected (e.g., defective) stack 1 approaches the transfer conveyor 17.

Figure 6:
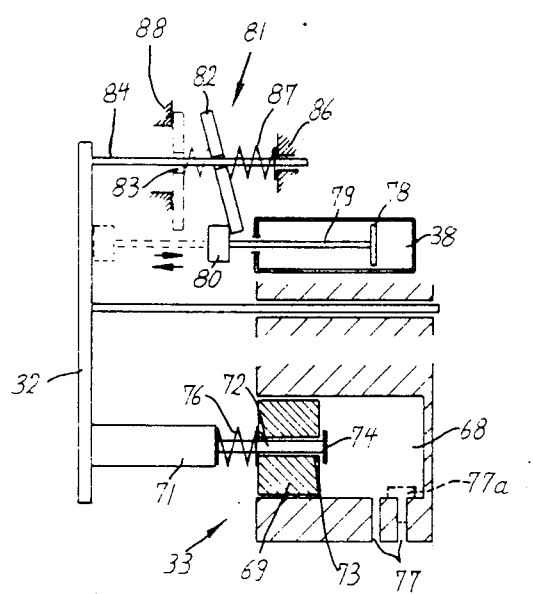
FIG. 6 is a diagrammatic sectional view of the bumper, of the shock absorber for the bumper and of the biasing, moving and blocking means for the bumper.

FIG. 6 shows the bumper 32 with shock absorber 33 and the motor 38 which returns the bumper to its starting position after the latter expels a stack 1 from the path which is defined by the second transporting unit T2. The shock absorber 33 defines an oil-filled chamber 68 whose front end is sealed by a reciprocable plunger 69. The latter is traversed by the smaller-diameter portion 72 of a stepped piston rod whose larger-diameter portion 71 is connected to the rear side of the bumper 32. A coil spring 76 surrounds the smaller-diameter portion 72; it bears against the end face of the larger-diameter portion 71 and reacts against the plunger 69 so that a flange 74 at the free end of the portion 72 abuts against the inner side of the plunger 69 in the interior of the chamber 68. The spring 76 biases the bumper 32 toward the extended or starting position. The reference character 73 denotes the axial bore of the plunger 69 for the smaller-diameter portion 72 of the piston rod of the shock absorber 33. Another purpose of the spring 76 is to effect a linear increase of the velocity-dependent damping force furnished by the shock absorber 33 and acting upon the bumper 32.

The chamber 68 has several ports 77 for controlled escape of oil from the shock absorber 33 when the bumper 32 is depressed by a freshly diverted stack 1. These ports constitute a composite outlet whose cross-sectional area can be varied by sealing one of the ports or by reducing the effective area of one or more ports by insertion of nozzles 77a or the like.

The bumper 32 is returned to its normal position by a ram 80 at the outer end of the piston rod 79 of the motor 38. The inner end of the piston rod 79 carries a piston 78 which is reciprocable in the cylinder of the motor 38. The motor 38 is a double-acting hydraulic or pneumatic motor which is actuated in response to signals from the monitoring device 37 as soon as a stack 1 is fully expelled from the second path (transporting unit T2) into the third path (transporting unit T3 or T3'). The flange 74 entrains the plunger 69 so that the shock absorber 33 is also reset in automatic response to return movement of the bumper 32 to its starting position under the action of the ram 80.

In order to prevent the bumper 32 from recoiling while it is being acted upon by a stack 1, the improved apparatus further comprises a blocking device 81 (FIG. 6) which is designed to hold the bumper against movement to its starting position while the outer side of the bumper is in contact with a stack. The blocking device 81 comprises a two-armed lever 82 having an aperture 83 whose diameter exceeds the diameter of a guide rod 84 which is affixed to the bumper 32 and is reciprocable in fixed bearings 86. A tension spring 87 surrounds the guide rod 84; it reacts against the bearings 86 and bears against the lever 82 to urge the latter toward or against a fixed stop 88. One arm of the lever 82 is located in the path of movement of the ram 80 which tilts the lever relative to and thereby jams the lever against the guide rod 84 (i.e., indirectly against the bumper 32) so that the bumper cannot move forwardly back to its starting position until and unless the right-hand chamber of the cylinder of the motor 38 receives pressurized fluid in order to cause the ram 80 to push the bumper 32 back to the starting position. The jamming of the lever 82 against the guide rod 84 is then terminated and the spring 87 is free to return the lever 82 into abutment with the stop 88. Friction between the surface surrounding the aperture 83 and the peripheral surface of the guide rod 84 suffices to prevent the lever 82 from returning into abutment with the stop 88 before the ram 80 begins to move toward the rear side of the bumper 32 so that the latter is effectively held against return movement to starting position prior to actuation of the motor 38 in a sense to move the ram 80 from the solid-line to the broken-line position of FIG. 6.

The provision of blocking device 81 contributes to reliability of the improved apparatus by reducing the likelihood of a change in orientation of the stack 1 which contacts the bumper 32 and is in the process of being expelled from the path which is defined by the second transporting unit T2.

An important advantage of the improved apparatus is that the stacks 1 which remain on the conveyors of the first transporting unit T1 need not be decelerated prior to or during diversion of selected stacks onto the conveyors of the second transporting unit T2, that the diverted stacks are treated gently, and that the orientation of diverted stacks remains unchanged (i.e., two sides of each diverted stack remain parallel to the direction which is indicated by the arrows 14 and 16). It has been found that the improved apparatus can divert selected stacks without any deformation and at the rate at which such stacks are supplied by the conveyors 3, 4, 6, 7, 8, 9 of the first transporting unit T1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for manipulating stacks of paper sheets or the like, comprising a first transporting unit arranged to advance a succession of stacks in a first direction, at a predetermined level and along a first path; a second transporting unit arranged to advance selected stacks of said succession along a second path and in a second direction at an oblique angle to said first direction, said second transporting unit having a stack-receiving portion adjacent to one side of said first path; a transfer conveyor normally disposed below said level and operable to advance selected stacks from said first path, in said second direction and onto the stack-receiving portion of said second transporting unit; means for raising and lowering said transfer conveyor above and below said level so that, when raised, said transfer conveyor extends into said first path and transfers the oncoming selected stack into said second path; a pusher adjacent to the other side of said first path opposite the stack-receiving portion of said second transporting unit; means for moving said pusher transversely of said first path so that said pusher assists said transfer conveyor in delivering selected stacks to the stack-receiving portion of said second transporting unit and preserves the orientation of selected stacks during such transfer; and a yieldable bumper disposed at said one side of said first path and arranged to deflect transferred stacks from said second path.

2. The apparatus of claim 1, wherein said first transporting unit comprises a plurality of elongated belt conveyors having stack-engaging upper reaches disposed at said level.

3. The apparatus of claim 1, wherein said pusher is movable at right angles to said first direction.

4. The apparatus of claim 1, wherein said second transporting unit comprises a plurality of endless belt conveyors having stack-engaging upper reaches.

5. The apparatus of claim 1, further comprising a third transporting unit arranged to receive deflected stacks from said second transporting unit.

6. The apparatus of claim 5, wherein said third transporting unit defines a third path which is normal to said first path.

7. The apparatus of claim 5, wherein said third transporting unit defines a third path which is parallel to said first path.

8. The apparatus of claim 1, wherein said pusher includes a stack-supporting portion and said first transporting unit includes a conveyor having a stack-engaging portion which slopes upwardly toward said stack-supporting portion.

9. The apparatus of claim 8, wherein said stack-supporting portion is substantially L-shaped and said conveyor of said first transporting unit is an endless belt conveyor having an upper reach which constitutes said stack-engaging portion.

10. The apparatus of claim 1, further comprising a driven shaft, said means for raising and lowering said transfer conveyor including a first cam arranged to receive motion from said shaft and said means for moving said pusher comprising a second cam arranged to receive motion from said shaft.

11. The apparatus of claim 10, further comprising a second shaft, rotary drive means for said transfer conveyor, means for transmitting torque to said second shaft from said driven shaft, and means for transmitting torque from said second shaft to said drive means.

12. The apparatus of claim 11, wherein at least one of said torque transmitting means comprises a toothed belt conveyor.

13. The apparatus of claim 10, further comprising intermittently engageable clutch means interposed between said shaft and said cams.

14. The apparatus of claim 13, wherein said clutch means is arranged to rotate said cams through one full revolution in response to each engagement thereof.

15. The apparatus of claim 14, further comprising means for braking said cams in disengaged condition of said clutch means.

16. The apparatus of claim 10, wherein said means for moving said pusher further comprises a one-armed lever arranged to track said second cam and to transmit motion to said pusher.

17. The apparatus of claim 16, wherein said means for moving said pusher further comprises a link connecting said lever with said pusher.

18. The apparatus of claim 10, wherein said means for raising and lowering said transfer conveyor further comprises a two-armed lever arranged to track said first cam and to transmit motion to said transfer conveyor.

19. The apparatus of claim 18, wherein said means for raising and lowering said transfer conveyor further comprises a lifting device interposed between said lever and said transfer conveyor.

20. The apparatus of claim 1, further comprising shock absorber means for yieldably opposing movement of said bumper under the action of transferred stacks.

21. The apparatus of claim 20, further comprising means for permanently biasing said bumper to an extended position from which said bumper is movable by transferred stacks and means for blocking return movement of said bumper to said extended position under the action of said biasing means while said bumper is engaged by a transferred stack.

22. The apparatus of claim 21, further comprising resetting means for returning said bumper to said extended position and for simultaneously deactivating said blocking means.

23. The apparatus of claim 22, wherein said resetting means comprises a fluid-operated motor having a reciprocable piston rod and a ram provided on said piston rod and arranged to move said bumper back to said extended position.

24. The apparatus of claim 23, wherein said piston rod is arranged to move said ram forwardly and backwards whereby the ram moves said bumper back to said extended position in response to forward movement thereof, said blocking means including a portion disposed in the path of movement of said ram so that said blocking means is activated and deactivated when said ram respectively performs a rearward and forward movement.

25. The apparatus of claim 24, wherein said portion of said blocking means comprises a lever and said pusher comprises an elongated guide tiltably supporting said lever.

26. The apparatus of claim 25, wherein said blocking means further comprises a spring arranged to bias said lever and a stop located in the path of movement of said lever under the action of said spring.

27. The apparatus of claim 21, wherein said shock absorber means comprises a liquid-containing chamber and a plunger reciprocably mounted in said chamber and connected to said bumper.

28. The apparatus of claim 27, wherein said liquid is oil.

29. The apparatus of claim 27, wherein said plunger of said shock absorber means is arranged to oppose movement of said bumper under the action of transferred stacks with a force which is a function of the speed of movement of said bumper and said shock absorber means further comprises resilient means for effecting linear amplification of such force in response to movement of said bumper under the action of a transferred stack.

30. The apparatus of claim 29, wherein said resilient means is said biasing means.

31. The apparatus of claim 27, wherein said chamber has outlet means and further comprising means for varying the effective cross-sectional area of said oulet means.

32. The apparatus of claim 1, further comprising means for initiating the operation of said raising and lowering means for said transfer conveyor and the operation of said moving means.

33. The apparatus of claim 32, wherein said initiating means comprises a photoelectronic monitoring device adjacent to said first path and arranged to transmit signals in response to detection of said selected stacks.

34. The apparatus of claim 1, wherein said bumper is movable by selected stacks from a first position to a second position and further comprising means for resetting said bumper from said second position back to said first position upon completed expulsion of a selected stack from said second path and means for initiating the operation of said resetting means.

35. The apparatus of claim 34, wherein said initiating means comprises photoelectronic means arranged to monitor expulsion of stacks from said second path.

* * * * *